United States Patent Office 3,304,228
Patented Feb. 14, 1967

3,304,228
DERIVATIVES OF 1,2,4-BENZOTHIADIAZINE-1,1-DIOXIDES
John G. Topliss, East Orange, N.J., assignor to Schering Corporation, Bloomfield, N.J., a corporation of New Jersey
No Drawing. Filed June 26, 1961, Ser. No. 119,320
11 Claims. (Cl. 167—65)

This invention relates to novel aniline derivatives having valuable therapeutic utility. More particularly, this invention relates to novel substituted 1,2,4-benzothiadiazine-1,1-dioxides, the novel substituted acylanilide intermediates therefor, and to the preparation and use of these novel chemical compounds.

It is known to chemists that a 1,2,4-benzothiadiazine-1,1-dioxide may exist in either one or both of two tautomeric forms. In one form the double bond is between the 3- and 4-position atoms, while in the other form the double bond is between the 2- and the 3-position atoms. Although in this specification there is only shown one tautomer, both tautomers are contemplated as being within the scope of this invention.

My novel 1,2,4-benzothiadiazine-1,1-dioxide compounds are of the following structural formula:

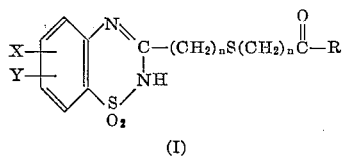

(I)

and the non-toxic alkali metal salts thereof, wherein X is a member of the group consisting of halogen or trifluoromethyl, said radical being attached to one of the positions 6- and 7-; Y is a member of the group consisting of hydrogen, halogen, trifluoromethyl and lower alkyl radicals, said radical being attached to one of the unsubstituted positions 6-, 7- and 8-; $n$ is an integer of from 1 to 3 inclusive; and R is a member of the group consisting of —$NH_2$, —$NHR_1$, —$NHNH_2$, or $NHNHR_1$ wherein $R_1$ is a lower alkyl having up to six carbon atoms.

As used herein the term "halogen" includes all halogens, but chlorine and bromine are preferred.

It is well-known that diuretics of the chlorothiazide type, i.e., those compounds which differ from the compounds of this invention in that they have a sulfamyl group attached to the benzenoid portion of the nucleus, usually in the 7-position, mildly reduce blood pressure in patients having hypertension. These compounds, however, do not demonstrate this activity under normotensive conditions. Quite unexpectedly, we have discovered that the novel 1,2,4-benzothiadiazine-1,1-dioxides (I) and the hereinafter discussed novel acylanilide intermediate compounds of this invention exhibit blood pressure lowering activity despite the fact that they possess no significant diuretic activity. Indeed, not only are they non-diuretic, but in some instances they may have anti-diuretic effects.

The novel compounds of this invention, therefore, are useful in the alleviation and control of essential hypertension, malignant hypertension, and the like, and peripheral vascular disorders.

The effective dosage of the compositions of this invention depends upon the severity, the stage, and the individual characteristics of each case. Generally, a range of from about 0.25 to about 15 mg. per kilogram of body weight per day would constitute the dosage range for the general class of compounds, with a range of 0.25 to 2.5 mg. per kg. per day for the preferred compounds.

The novel compounds of our invention may be used in the form of pharmaceutical preparations which contain the active ingredient in admixture with a pharmaceutical carrier suitable for enteral or parenteral administration. Such preparations may be in solid forms, as for example, tablets, capsules and suppositories, or in liquid forms, as for example, elixirs, emulsions and injectables.

In the formulation of pharmaceutical preparations there can be employed such substances which do not react with the active substances, as for example, water gelatin, lactose, starches, magnesium stearate, calcium carbonate, talc, vegetable oils, benzyl alcohols, gums, polyalkylene glycols, and petroleum jelly. The active ingredient is preferably present in the preparation in such proportions by weight that the proportion by weight of active ingredient in the formulation to be administered lies between 0.1% and 50%.

There also may be incorporated into the aforementioned pharmaceutical dosage forms an additional active ingredient such as a therapeutically effective quantity of a diuretic agent.

Representative preparations are illustrated below with the preparations administrable once to several times per day.

TABLET FORMULATION

The following formulation provides for the manufacture of 1000 tablets:

|  | G. |
|---|---|
| (1) 3 - (N - methylcarboxamidomethylthiomethyl)-6-chloro-1,2,4-benzothiadiazine-1,1-dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blended mixture of the active ingredient (1) and the magnesium stearate. Thoroughly blend and then press into tablets of 300 mg. each.

CAPSULE FORMULATION

The following formulation provides for the manufacture of 1000 capsules:

|  | G. |
|---|---|
| (1) 3-(N-methylcarboxamidomethylthiomethyl)-6-chloro-1,2,4-benzothiadiazine-1,1-dioxide | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 3-(N-methylcarboxamidomethylthiomethyl) - 6-chloro - 1,2,4 - benzothiadiazine-1,1-dioxide.

PARENTERAL FORMULATION

The following formulation provides for the manufacture of 1000 vials each containing 10 mg. of active ingredient, as its sodium salt:

| (1) 3 - (N-methylcarboxamidomethylthiomethyl)-6-chloro-1,2,4-benzothiadiazine-1,1-dioxide sodium salt | gm | 10.55 |
|---|---|---|
| (2) Monobasic potassium phosphate | gm | 6.0 |
| (3) Water for injection, U.S.P. q.s. | liter | 1.0 |

Dissolve ingredients (1), (2), and (3) in approximately 80 percent of the volume of water and filter the resulting solution. Add to the filtrate sufficient water to make to a 1000 ml. volume. Sterile-filter the solution and aseptically fill one milliliter portions of the so-prepared solution into two milliliter vials then lyophilize. After the lyophylized cake is dry, aseptically stopper the vials with rubber plugs and seal.

Exemplary of the acylanilide intermediate-type hypotensive-agent is 5-chloro-2-sulfamyl-[α-(N-methylcarboxamidomethylthio)]acetanilide. By substituting an equal amount of this acylanilide for the 1,2,4-benzothiadiazine-1,1-dioxide active ingredient of the foregoing pharmaceutical formulations and by following substantially the same procedures, there is also produced the appropriate pharmaceutical formulation of 5-chloro-2-sulfamyl-[α-(N-methylcarboxamidomethylthio)]acetanilide.

The preferred novel hypotensive compounds of this invention may be exemplified by the following compounds:

List A.—

3-(N-methylcarboxamidomethylthiomethyl)-6-chloro-1,2,4-benzothiadiazine-1,1-dioxide;

3-[(2'-carboxhydrazidoethyl)thiomethyl]-7-chloro-1,2,4-benzothiadiazine-1,1-dioxide;

3-[2'-(carboxamidomethylthio)ethyl]-6,7-dichloro-1,2,4-benzothiadiazine-1,1-dioxide;

3-[3'-(N₂-ethylcarboxhydrazidomethylthio)propyl]-6-trifluoromethyl-1,2,4-benzothiadiazine-1,1-dioxide;

4,5-dichloro-2-sulfamyl-[β-(carboxamidomethylthio)]propionanilide;

5-trifluoromethyl-2-sulfamyl-[α-(N₂-ethylcarboxhydrazidomethylthio)]butyranilide;

5-chloro-2-sulfamyl-(α-chloro)acetanilide;

5-chloro-2-sulfamyl-[α-(carbomethoxymethylthiomethyl)]acetanilide;

5-chloro-2-sulfamyl-[α-(N-methylcarboxamidomethylthio)]acetanilide;

4-chloro-2-sulfamyl-[α-(2'-carboxhydrazidoethyl)thio]acetanilide;

4-chloro-2-sulfamyl-[α-(2'-carbomethoxyethylthiomethyl)]acetanilide.

In order to prepare the novel compounds, it is preferred to employ as a starting material an X,Y-substituted o-sulfamylaniline or a derivative thereof, wherein X and Y are as hereinabove defined.

The X,Y-substituted o-sulfamylaniline starting materials can be prepared according to a procedure which comprises treating an X,Y-substituted o-chloronitrobenzene (II) with a mixture of thiourea, benzyl chloride and alkali, yielding an o-thioether (III) which compound is then sequentially treated with chlorine in aqueous acid, and then ammonia, to yield a nitrosulfonamide (IV). The nitrosulfonamide is reduced, as with iron in ammonium chloride solution to yield an X,Y-substituted o-sulfamylaniline (V). This general preparative reaction is shown in Reaction Scheme A below:

(A)

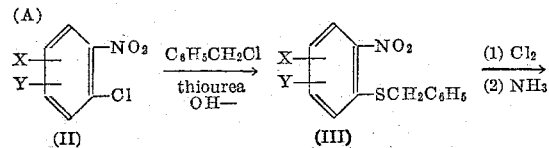

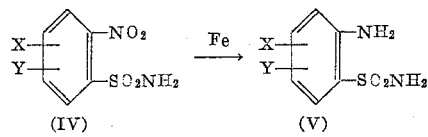

In general, if a particular o-nitrochlorobenzene (II) is not known, it may be prepared by any of the usual well-known and analogous procedures.

The intermediate compounds useful for preparing the novel 1,2,4-benzothiadiazine-1,1-dioxides of this invention may be represented by the formula:

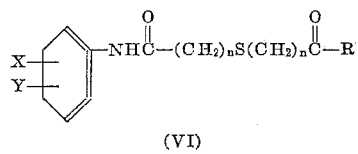

(VI)

wherein X, Y, R and n are as hereinabove defined. These compounds may be prepared from the above described o-sulfamylanilines (V) by a multistep process which first involves haloacylation of the o-sulfamylaniline to produce an X,Y-substituted-o-sulfamyl (halo) acylanilide (VII) which is treated with a suitable mercaptan to produce the appropriate thio compound (VIII). These thio acylanilides are reacted with an appropriate amine (or hydrazine) to form the desired intermediate (VI). The general preparative reaction is shown below in Reaction Scheme B:

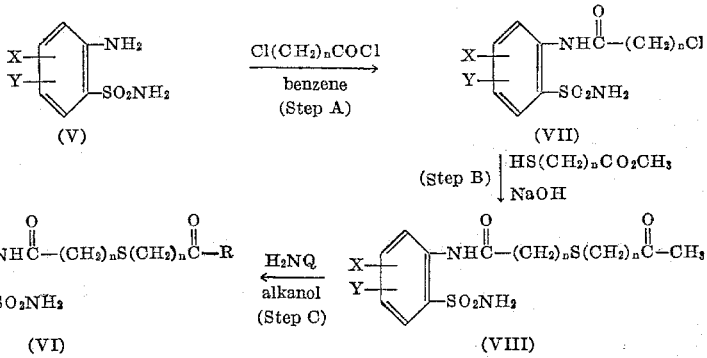

wherein Q is either hydrogen, lower alkyl, —NH₂, or —NH lower alkyl. Although the chloroacyl chloride is depicted as the reactant in Step A of the above process, it is to be understood that other haloacyl halides may similarly be employed.

The haloacylation of Step A may be effected by heating the reactants at above room temperature, although it is generally preferred to carry out the reaction under reflux conditions wherein any of the usual non-reactive solvents such as benzene, tetrahydrofuran, dioxane and the like are employed. Similarly, Step B is preferably effected under increased temperature conditions wherein the reaction mixture is heated at temperatures from room temperature up to the reflux, such reaction being effected in the presence of an alkali metal hydroxide in a non-reactive solvent such as a lower alkanol, e.g. methanol or ethanol, and subsequently evaporating the solvent. Step C of Reaction Scheme B may be effected by gently warming the reactants together in a suitable non-reactive solvent such as for example a lower alkanol, preferably methanol or ethanol, and evaporating off the solvent.

The anilide-derivative intermediate (VI) is isolated, heated to above its melting point whereupon cyclization occurs forming the appropriate 1,2,4-benzothiadiazine-1,1-dioxide (I).

From the foregoing, it is evident to one skilled in the art of chemical synthesis that the compounds of this invention may also be manufactured by such other methods or processes as are described in published patent and technical literature.

The following examples will serve to further exemplify and illustrate the nature of these various reactions, and to further demonstrate the scope of the various groups which may be present in particular positions, and to further demonstrate the various intermediary compounds hereinabove described.

These examples, however, are not intended and should not be construed in any way so as to limit the scope of the present invention, but are presented for illustrative purposes only.

Preparation of starting materials:

*Example 1.—2-sulfamyl-4-chloroaniline*

*Step A.*—Mix 63 g. of benzyl chloride, 38 g. of thiourea, 3 drops of concentrated ammonium hydroxide solution, and 250 ml. of 95% ethanol. Reflux the mixture for 3 hours. Cool and add a solution containing 96 g. of 2,4-dichloro-nitrobenzene in 200 ml. of ethanol. Heat the mixture to reflux and then add dropwise a solution of 70 g. of potassium hydroxide in 500 ml. of ethanol. Continue refluxing for 2 hours, and then cool and filter the solids produced. Wash the solid with aqueous ethanol and dry. There is thus produced 2-benzylthio-4-chloro-nitrobenzene. (A compound corresponding to III above.)

*Step B.*—Suspend 50 g. of 2-benzylthio-4-chloro-nitrobenzene in 1000 ml. of 33% aqueous acetic acid. Bubble chlorine gas through the suspension during a period of 2 hours, while maintaining the suspension at a temperature in the range of about 0°–5° C.

Extract the mixture 3 times with 400 ml. each of chloroform, pool the extracts, and wash the chloroform solution with water. Dry the chloroform solution with anhydrous sodium sulfate and filter.

*Step C.*—Evaporate the dried chloroform solution to a residue, add to the residue 400 ml. of liquid ammonia, stir and allow the excess ammonia to evaporate, triturate the residue with hexane to form a crystalline solid, continue trituration with water,, and filter te solid to yield substantially pure 2-sulfamyl-4-chloro-nitrobenzene. Recrystallize from aqueous methanol.

*Step D.*—Mix together 4.4 g. of ammonium chloride, 18 ml. of methanol, 9 ml. of water and 3.0 g. of 2-sulfamyl-4-chloro-nitrobenzene. Heat the mixture to reflux. Add portionwise 4.4 g. of iron filings during a period of about 1½ hours. Cool the mixture and filter. Concentrate the filtrate to a residue. Triturate the residue with 15 ml. of water and filter the solid. Recrystallize the solid from aqueous methanol to yield substantially pure 2-sulfamyl-4-chloroaniline. (A compound corresponding to V above.)

As is apparent to one skilled in the art, by replacing the 2,4-dichloronitrobenzene of Example 1, with other appropriately substituted 2-chloro-nitrobenzenes the production of other o-sulfamylanilines starting materials may be effected by following substantially the procedures described in Example 1.

Therefore, by replacing the aforesaid 2,4-dichloro-nitrobenzene with the particular substituted 2-chloro-nitrobenzenes (II) enumerated below in Group A, and by following substantially the procedures of Steps A, B, C and D exemplified above, there are produced, respectively, the appropriate intermediates III and IV, and the corresponding 2-sulfamylaniline compounds (V) enumerated below in Group B.

*Group A.—*

(1) 2,4,5-trichloro-nitrobenzene;
(2) 2,4,5-tribromo-nitrobenzene;
(3) 2,4-dichloro-5-trifluoromethyl-nitrobenzene;
(4) 2,5-dichloro-4-trifluoromethyl-nitrobenzene;
(5) 2-chloro-4-trifluoromethyl-nitrobenzene;
(6) 2-chloro-4,5-di-trifluoro-methyl-nitrobenzene;
(7) 2,4-dichloro-5-methyl-nitrobenzene;
(8) 2,5-dichloro-4-methyl-nitrobenzene;
(9) 2-chloro-4-trifluoromethyl-5-methyl-nitrobenzene;
(10) 2-chloro-4-methyl-5-trifluoromethyl-nitrobenzene;
(11) 2-chloro-5-trifluoromethyl-nitrobenzene;
(12) 2,4-dibromo-nitrobenzene;
(13) 2,5-dibromo-nitrobenzene;
(14) 2,3,5-trichloro-nitrobenzene;
(15) 2,5-dichloro-3-methyl-nitrobenzene;
(16) 2,4-dichloro-3-methyl-nitrobenzene.

*Group B.—*

(1) 2-sulfamyl-4,5-dichloroaniline;
(2) 2-sulfamyl-4,5-dibromoaniline;
(3) 2-sulfamyl-4-chloro-5-trifluoromethyl-aniline;
(4) 2-sulfamyl-4-trifluoromethyl-5-chloroaniline;
(5) 2-sulfamyl-4-trifluoromethyl-aniline;
(6) 2-sulfamyl-4,5-di-trifluoromethyl-aniline;
(7) 2-sulfamyl-4-chloro-5-methyl-aniline;
(8) 2-sulfamyl-4-methyl-5-chloro-aniline;
(9) 2-sulfamyl-4-trifluoromethyl-5-methyl-aniline;
(10) 2-sulfamyl-4-methyl-5-trifluoromethyl-aniline;
(11) 2-sulfamyl-5-trifluoromethyl-aniline;
(12) 2-sulfamyl-4-bromoaniline;
(13) 2-sulfamyl-5-bromoaniline;
(14) 2-sulfamyl-3,5-dichloro-aniline;
(15) 2-sulfamyl-3-methyl-5-chloroaniline;
(16) 2-sulfamyl-3-methyl-4-chloro-aniline.

Preparation of intermediates:

*Example 2.—5-chloro-2-sulfamyl-[α-(N-methylcarboxamidomethylthio]acetanilide*

*Step A.*—Suspend 10 g. of 5-chloro-2-sulfamylaniline and 13.65 g. of chloroacetyl chloride in 150 ml. of benzene. Heat the suspension for 4 hours at reflux temperature. Cool, and filter the resulting product, 5-chloro-2-sulfamyl-(α-chloro)acetanilide and wash with benzene.

By substituting the chloroacetyl chloride reactant of Step A above, with equivalent quantities of other haloacyl halides, the corresponding 5-chloro-2-sulfamyl-(halo)acylanilides may be formed. For example, the bromoacetyl bromide will produce the (α-bromo)acetanilide; chloropropionyl chloride, the (β-chloro)propionanilide; iodobutyryl iodide the (α-iodo) butyranilide.

*Step B.*—Suspend 10 g. of 5-chloro-2-sulfamyl-(α-chloro) acetanilide, 3.75 g. of methyl mercaptoacetate and 1.41 g. of sodium hydroxide in 100 ml. of methanol. Heat the suspension at reflux temperature for 3 hours. Remove 90% of the remaining solvent by evaporation. Add water and collect the crude product by filtration. Recrystallize the thus obtained 5-chloro-2-sulfamyl-[α-(carbomethoxymethylthio)]acetanilide from aqueous methanol.

By substituting the methyl mercaptoacetate reactant of Step B above, with equivalent quantities of other methyl mercapto esters, the corresponding 5-chloro-2-sulfamyl-[carbomethoxyalkyl thio] acylanilide may be formed. For example, the methyl-β-mercapto propionate wil produce the [α-(2'-carbomethoxyethylthio)]acetanilide; the methyl-γ-mercapto butyrate the [α-(3'-carbomethoxypropylthio) [acetanilide.

*Step C.*—Suspend 10 g. of 5 - chloro - 2 - sulfamyl - [α-(carbomethoxy-methylthio)]acetanilide in 100 ml. of 10% ethanolic methylamine solution. Warm gently for 2 hours. Remove the excess of ethanolic methylamine under vacuum and crystallize the residue from aqueous methanol to yield 5-chloro-2-sulfamyl-2α-(N-methylcarboxaminomethylthio)]acetanilide.

By substituting the methylamine reactant of Step C, above, with equivalent quantities of other lower alkyl amines or hydrazines the corresponding 5-chloro-2-sulfamyl-[α-(N-alkyl carboxamidomethylthio)]acetanilide or 5-chloro-2-sulfamyl-[α - (N$_2$ - alkylcarboxhydrazidomethylthio)]acetanilide·will be produced. For example, hydrazine will produce the [α-(hydrazidomethylthio)];

methylhydrazine the [α - (N₂ - methylhydrazidomethylthio)].

By replacing the 5-chloro-2-sulfamylaniline starting material of Step A of this example with equivalent quantities of the compounds enumerated in Group B, above, and then by following substantially the procedures of Steps A, B and C of Example 2, there are produced, respectively, the corresponding intermediates (VII) and (VIII), and the corresponding 2-sulfamylacylanilides (VI) enumerated below in Group C.

*Group C.—*

(1) 4,5-dichloro-2-sulfamyl-[α-(N-methylcarboxamidomethylthio)]acetanilide;
(2) 4,5-dibromo-2-sulfamyl-[α-(N-methylcarboxamidomethylthio)]acetanilide;
(3) 4-chloro-5-trifluoromethyl-2-sulfamyl-[α-(N-methylcarboxamidomethylthio)]actanilide;
(4) 4-trifluoromethyl-5-chloro-2-sulfamyl-[α-(N-methylcarboxamidomethylthio)]acetanilide;
(5) 4-trifluoromethyl-2-sulfamyl-[α-(N-methylcarboxamidomethylthio)]acetanilide;
(6) 4,5-di-trifluoromethyl-2-sulfamyl[α-(N-methylcarboxamidomethylthio)]acetanilide;
(7) 4-chloro-5-methyl-2-sulfamyl-[α-(N-methylcarboxamidomethylthio)]acetanilide;
(8) 4-methyl-5-chloro-2-sulfamyl-[α-(N-methylcarboxamidomethylthio)]acetanilide;
(9) 4-trifluoromethyl-5-methyl-2-sulfamyl-[α-(N-methylcarboxamidomethylthio)]acetanilide;
(10) 4-methyl-5-trifluoromethyl-2-sulfamyl-[α-(N-methylcarboxamidomethylthio)]acetanilide;
(11) 5-trifluoromethyl-2-sulfamyl-[α-(N-methylcarboxamidomethylthio)]acetanilide;
(12) 4-bromo-2-sulfamyl-[α-(N-methylcarboxamidomethylthio)]acetanilide;
(13) 5-bromo-2-sulfamyl-[α-(N-methylcarboxamidomethylthio)]acetanilide;
(14) 3,5-dichloro-2-sulfamyl-[α-(N-methylcarboxamidomethylthio)]acetanilide;
(15) 3-methyl-5-chloro-2-sulfamyl[α-(N-methylcarboxamidomethylthio)]acetanilide;
(16) 3-methyl-4-chloro-2-sulfamyl-[α-(N-methylcarboxamidomethylthio)]acetanilide;

Preparation of 1,2,4-benzothiadiazine-1,1-dioxide materials:

*Example 3.—3-(N-methylcarboxamidomethylthiomethyl)-6-chloro-1,2,4-benzothiadiazine-1,1-dioxide*

Heat 5-chloro-2-sulfamyl-[α-(N-carbomethoxymethylthio)]acetanilide for 10 minutes at 200–220° C. Recrystallize the resulting fusion product from aqueous methanol to yield 3-(N-methylcarboxamidomethylthiomethyl)-6-chloro-1,2,4-benzothiadiazine-1,1-dioxide.

By replacing the 5-chloro-2-sulfamyl[α-(N-methylcarboxamidomethylthio)]acetanilide of this example with compounds enumerated in Group C, above, and by following substantially the procedure of this example there is produced, respectively, the following compounds of Group D.

*Group D.—*

(1) 3-(N-methylcarboxamidomethylthiomethyl)-6,7-dichloro-1,2,4-benzothiadiazine-1,1-dioxide;
(2) 3-(N-methylcarboxamidomethylthiomethyl)-6,7-dibromo-1,2,4-benzothiadiazine-1,1-dioxide;
(3) 3-(N-methylcarboxamidomethylthiomethyl)-6-trifluoromethyl-7-chloro-1,2,4-benzothiadiazine-1,1-dioxide;
(4) 3-(N-methylcarboxamidomethylthiomethyl)-6-chloro-7-trifluoromethyl-1,2,4-benzothiadiazine-1,1-dioxide;
(5) 3-(N-methylcarboxamidomethylthiomethyl)-7-trifluoromethyl-1,2,4-benzothiadiazine-1,1-dioxide;
(6) 3-(N-methylcarboxamidomethylthiomethyl)-6,7-ditrifluoromethyl-1,2,4-benzothiadiazine-1,1-dioxide;
(7) 3-(N-methylcarboxamidomethylthiomethyl)-6-methyl-7-chloro-1,2,4-benzothiadiazine-1,1-dioxide;
(8) 3-(N-methylcarboxamidomethylthiomethyl)-6-chloro-7-methyl-1,2,4-benzothiadiazine-1,1-dioxide;
(9) 3-(N-methylcarboxamidomethylthiomethyl)-6-methyl-7-trifluoromethyl-1,2,4-benzothiadiazine-1,1-dioxide;
(10) 3-(N-methylcarboamidomethylthiomethyl)-6-trifluoromethyl-7-methyl-1,2,4-benzothiadiazine-1,1-dioxide;
(11) 3-(N-methylcarboxamidomethylthiomethyl)-6-bromo-1,2,4-benzothiadiazine-1,1-dioxide;
(12) 3-(N-methylcarboxamidomethylthiomethyl)-7-bromo-1,2,4-benzothiadiazone-1,1,-dioxide;
(13) 3-(N-methylcarboxamidomethylthiomethyl)-6-bromo-1,2,4-benzothiadiazine-1,1-dioxide;
(14) 3-(N-methylcarboxamidomethylthiomethyl)-6,8-dichloro-1,2,4-benzothiadiazine-1,1-dioxide;
(15) 3-(N-methylcarboxamidomethylthiomethyl)-6-chloro-8-methyl-1,2,4-benzothiadiazine-1,1-dioxide;
(16) 3-(N-methylcarboxamidomethylthiomethyl)-7-chloro-8-methyl-1,2,4-benzothiadiazine-1,1-dioxide.

The subject matter to be claimed is:

1. A compound of the formula:

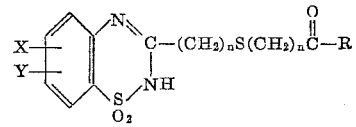

and the tautomers and alkali metal salts thereof, wherein X represents halogen or trifluoromethyl located at one of the positions selected from the group consisting of the 6- and 7-positions, Y represents hydrogen, halogen, trifluoromethyl or methyl attached to one of the unsubstituted positions selected from the group consisting of the 6-, 7- and 8-positions, $n$ represents an integer from one to three, and R represents a member of the group consisting of —NH₂, —NHR₁, —NHNH₂, and NHNHR₁ wherein R₁ is lower alkyl.

2.

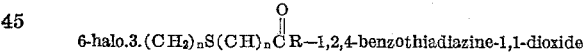

wherein $n$ is an integer from one to three, and R represents a member of the group consisting of —NH₂, —NHR₁, —NHNH₂, and —NHNHR₁ wherein R₁ is lower alkyl.

3.

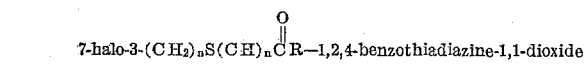

wherein $n$ is an integer from one to three, and R represents a member of the group consisting of —NH₂, —NHR₁, —NHNH₂, and —NHNHR₁ wherein R₁ is lower alkyl.

4.

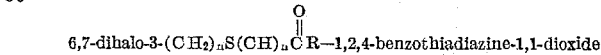

wherein $n$ is an integer from one to three, and R represents a member of the group consisting of —NH₂, fluoromethyl or methyl attached to one of the unsubstialkyl.

5.

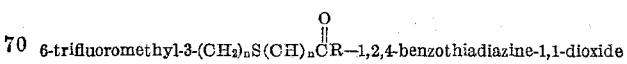

wherein $n$ is an integer from one to three, and R represents a member of the group consisting of —NH₂, —NHR₁, —NHNH₂, and —NHNHR₁ wherein R₁ is lower alkyl.

6. 3 - (N - methylcarboxamidomethylthiomethyl) - 6-chloro-1,2,4-benzothiadiazine-1,1-dioxide.

7. 3 - [3' - (carboxamidomethylthio)propyl - 6,7 - dichloro-1,2,4-benzothiadiazine-1,1-dioxide.

8. In the process for preparing a 1,2,4-benzothiadiazine-1,1-dioxide of the formula:

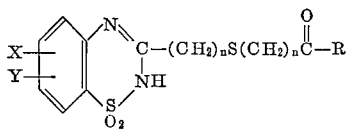

wherein X represents halogen or trifluoromethyl located at the one of the positions selected from the group consisting of the 6- and 7-positions; Y represents hydrogen, halogen, trifluoromethyl or methyl attached to one of the unsubstituted positions 6-, 6- or 8-positions; $n$ represents an integer from one to three; and R represents a member of the group consisting of —$NH_2$, —$NHR_1$, —$NHNH_2$, and —$NHNHR_1$ wherein $R_1$ is lower alkyl, the step which comprises heating to above its melting point a substance of the formula:

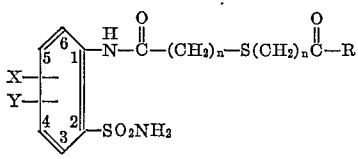

wherein X is attached at positions selected from the group consisting of the 4- and 5-positions and Y is attached to one of the unsubstituted positions selected from the group consisting of the 3-, 5- and 5-positions.

9. A pharmaceutical composition comprising a therapeutically effective dosage of a compound of the formula:

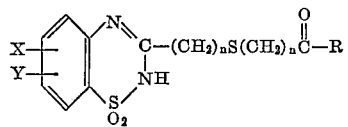

and the tautomers and alkali metal salts thereof, wherein X represents halogen or trifluoromethyl located at one of the positions selected from the group consisting of the 6- and 7-positions, Y represents hydrogen, halogen, trifluoromethyl or methyl attached to one of the unsubstituted positions selected from the group consisting of the 6-, 7- and 8-positions, $n$ represents an integer from one to three, and R represents a member of the group consisting of —$NH_2$, —$NHR_1$, —$NHNH_2$, and $NHNHR_1$, wherein $R_1$ is lower alkyl in admixture with a pharmaceutical carrier.

10. The composition of claim 9 wherein the active ingredient is 3-(N-methylcarboxamidomethylthiomethyl)-6-chloro-1,2,4-benzothiadiazine-1,1-dioxide.

11. A method for lowering blood pressure in mammals which comprises administering a therapeutically effective dose of a compound of the formula:

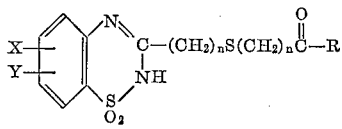

and the tautomers and alkali metal salts thereof, wherein X represents halogen or trifluoromethyl located at one of the positions selected from the group consisting of the 6- and 7-positions, Y represents hydrogen, halogen, trifluoromethyl or methyl attached to one of the unsubstituted positions selected from the group consisting of the 6-, 7- and 8-positions, $n$ represents an integer from one to three, and R represents a member of the group consisting of —$NH_2$, $NHR_1$, $NHNH_2$, and $NHNHR_1$, wherein $R_1$ is lower alkyl.

References Cited by the Examiner
UNITED STATES PATENTS

| | | | |
|---|---|---|---|
| 2,059,903 | 11/1936 | Petitcolas | 260—556 |
| 2,388,529 | 11/1945 | D'Alelio | 260—556 |
| 2,726,264 | 12/1955 | Gregory | 260—556 |
| 2,794,834 | 6/1957 | Randall et al. | 260—556 |
| 2,910,473 | 10/1959 | Novello | 260—243 |
| 2,910,476 | 10/1959 | Novello | 260—243 |
| 3,111,517 | 11/1963 | McLamore et al. | 260—243 |

NICHOLAS S. RIZZO, Primary Examiner.